United States Patent [19]

Frobenius

[11] 4,140,083

[45] Feb. 20, 1979

[54] METHOD AND APPARATUS FOR LEAN BURN MIXTURE CONTROL OF AN INTERNAL COMBUSTION ENGINE

[75] Inventor: Wolf-Dietrich Frobenius, Dortmund-Dorstfeld, Fed. Rep. of Germany

[73] Assignee: Robert Bosch GmbH, Stuttgart, Fed. Rep. of Germany

[21] Appl. No.: 843,000

[22] Filed: Oct. 17, 1977

[30] Foreign Application Priority Data

Nov. 19, 1976 [DE] Fed. Rep. of Germany ....... 2652625

[51] Int. Cl.[2] ........................ F02B 5/02; G06F 15/20; F02M 7/00

[52] U.S. Cl. .......................... 123/32 EA; 123/32 EB; 123/119 EC; 364/431

[58] Field of Search ......... 123/32 EA, 32 EB, 119 D, 123/119 EC, 117 D; 364/431, 442

[56] References Cited

U.S. PATENT DOCUMENTS

| | | | |
|---|---|---|---|
| 3,789,816 | 2/1974 | Taplin et al. | 123/32 EA |
| 4,044,234 | 8/1977 | Frobenius et al. | 364/431 |
| 4,044,235 | 8/1977 | Frobenius | 123/32 EA |
| 4,044,236 | 8/1977 | Bianchi et al. | 123/32 EA |
| 4,073,270 | 2/1978 | Endo | 123/32 EB |
| 4,091,780 | 5/1978 | Masaki et al. | 123/119 D |
| 4,092,955 | 6/1978 | Reddy | 123/32 EA |

*Primary Examiner*—Charles J. Myhre
*Assistant Examiner*—P. S. Lall
*Attorney, Agent, or Firm*—Edwin E. Greigg

[57] ABSTRACT

A fuel mixture control system, for example a fuel injection system, has a control device which accepts signals for final correction of the fuel mixture. In particular, the final correction is made on the basis of engine roughness which is used as a measure of the degree of lean burning of the engine. The engine roughness is determined digitally by forming second differences of engine period in sequential digital counters whose contents are shifted after each counting period. The final counter is counted down at an rpm-dependent frequency. The digital datum related to engine roughness is examined for two conditions, i.e., for whether it exceeded a set-point value and for the nature of its algebraic sign. In one of the four possible states of combination of these conditions, the mixture is slightly enriched, whereas in the other three states, it is leaned out to a maximum degree.

5 Claims, 1 Drawing Figure

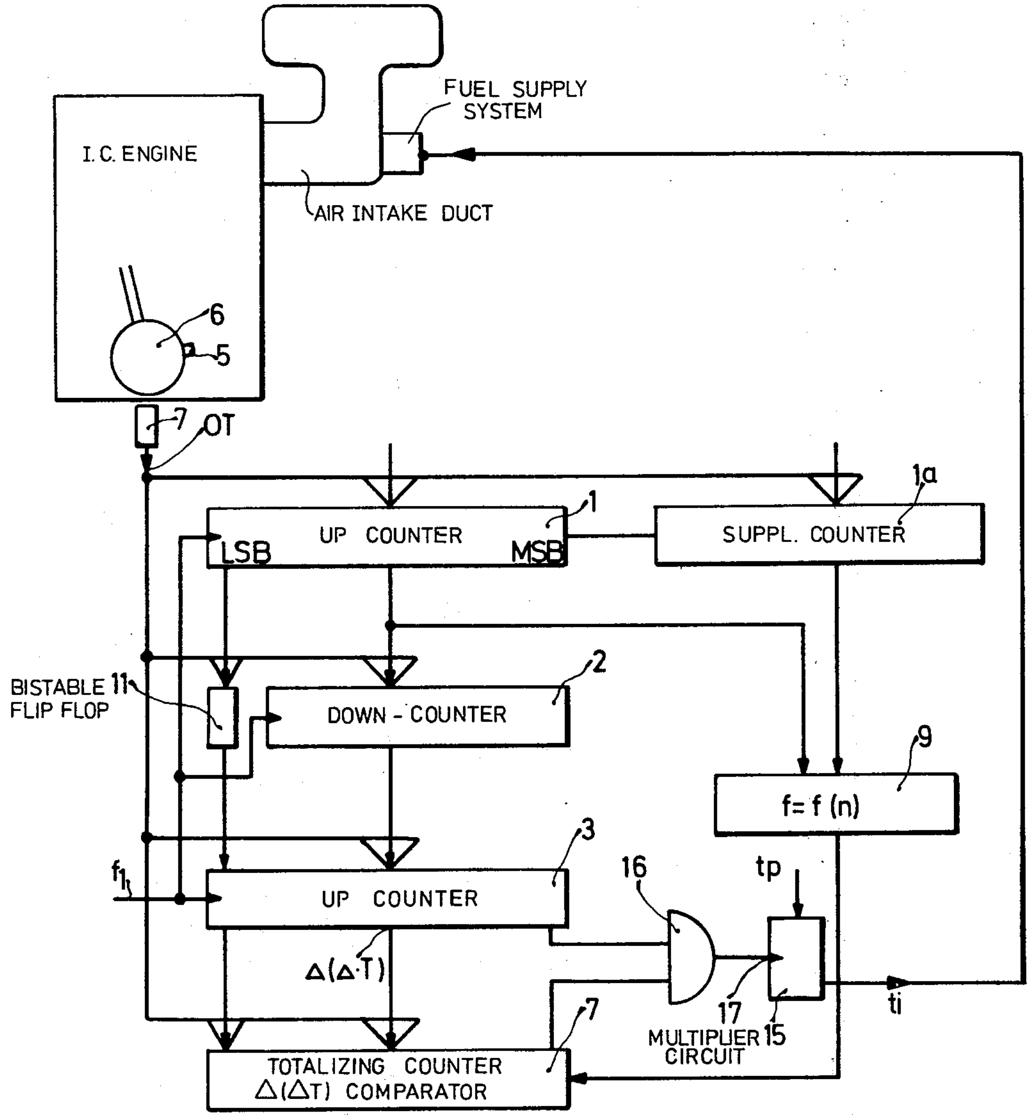
FUEL SUPPLY SYSTEM
I. C. ENGINE
AIR INTAKE DUCT
6
5
7
OT
1
1a
UP COUNTER
LSB
MSB
SUPPL. COUNTER
2
BISTABLE FLIP FLOP
11
DOWN - COUNTER
9
f= f (n)
3
16
tp
$f_1$
UP COUNTER
Δ(Δ·T)
17
15
ti
7
MULTIPLIER CIRCUIT
TOTALIZING COUNTER
Δ(ΔT) COMPARATOR

METHOD AND APPARATUS FOR LEAN BURN MIXTURE CONTROL OF AN INTERNAL COMBUSTION ENGINE

INTRODUCTION

The present invention is to be construed as relating to and may be used in association with an invention described and claimed in U.S. Pat. No. 4,044,235, the descriptive contents of which are hereby expressly incorporated by reference.

BACKGROUND OF THE INVENTION

The invention relates to a method and an apparatus for controlling the operation of an internal combustion engine. More particularly, the invention relates to engine control at the so-called lean burning or lean running limit, especially, but not necessarily, when used in conjunction with an electronic fuel injection system which receives data regarding engine speed (rpm) and aspirated air flow rate and which generates fuel control pulses whose duration is related to the amount of fuel to be delivered by electromagnetic fuel supply devices, for example fuel injection valves. Electronic fuel supply systems of this type normally contain a correction circuit (multiplier circuit) so as to permit an adjustment or fine tuning of the duration of the fuel control pulses as a function of further engine variables, for example temperature, altitude, etc. One of the further variables may be in particular the so-called engine roughness defined as being fluctuations in the rotational acceleration of inertial engine members. In a method and an apparatus to which this invention relates particularly, the engine roughness is determined by measuring the fluctuations of the engine speed in three successive crankshaft revolutions. During each period of revolution, a pulse train of a certain counting frequency is supplied to a first up-counter as well as to a third up-counter while twice the counting frequency is supplied to a second, down-counter. At the termination of each crankshaft revolution, the contents of these counters are transferred into the next adjacent counter while the first counter is reset to zero. Subsequently, a comparison is performed between the actual value and a set-point value by transferring the contents of the last up-counter to a totalizing counter and counting the latter down with an rpm-dependent frequency which constitutes the set-point value. The known method and apparatus to which the present invention particularly relates is described in detail in the above-mentioned U.S. Pat. No. 4,044,235. There is described in that patent a digital method for carrying out a lean-burning control of an internal combustion engine in which sequential periods T of engine revolution are measured to form the quantity $\Delta(\Delta T)$ and to compare this quantity with a predetermined set-point value at the termination of a crankshaft revolution. The number of times which the magnitude of the quantity $\Delta(\Delta T)$ exceeds the set-point value in one direction or the other is transformed by an integrating member into a proportional DC voltage which is fed to a multiplying circuit within an electric fuel supply system, in particular to an electronic fuel injection system so as to vary the duration of fuel control pulses. When an analog type integrating circuit as described in U.S. Pat. No. 4,044,235 is used, the response time is of the order of seconds. When such a relatively slow acting analog integrating circuit is used in conjunction with a very rapidly operating digital system for lean burning control, there is a certain amount of mismatching because it is not always possible to change the duration of the fuel control pulses fast enough to permit an optimum effect on the drivability of the vehicle equipped with such a system.

OBJECT AND SUMMARY OF THE INVENTION

It is thus a principal object of the present invention to define a process and an apparatus which is to be used in conjunction with a fuel control system for lean burning control such as described in U.S. Pat. No. 4,044,235 in which the fuel control pulses can be adjusted extremely rapidly by the lean burning control device, practically within one crankshaft revolution.

The multiplying circuit of the known and assumed existing fuel injection system or fuel control system is so constructed as to permit the application of an external DC voltage to cause an enrichment or leaning out of the fuel mixture eventually supplied to the engine. Thus, in particular, it is assumed to be possible to supply to the multiplying circuit of the fuel control system two different voltage levels representative, respectively, of an enrichment or a leaning out of the fuel mixture supplied to the engine, by lengthening or shortening the duration of fuel control pulses. These two voltage levels supplied to the multiplying circuit may be used to place the electric fuel control or fuel injection system in what might be called a 'basic setting' which constitutes either a certain amount of enrichment of the fuel-air mixture or a maximum leaning out. The choice of voltage levels supplied to the multiplier is based on the magnitude and algebraic sign of the engine roughness as will be explained in detail below. The two voltage levels supplied to the multiplying circuit may be supplied on the basis of entirely digital signals, thereby providing the advantage of eliminating an analog integrating circuit and causing a substantial decrease in the response time of the overall system. Improved response time permits a rapid compensation of fluctuations in the engine acceleration, thereby improving drivability. These and other objects are attained according to the invention in a method in which a quantity related to engine roughness and equal to the value $\Delta(\Delta T)$ is obtained, as previously stated, by counting the duration of sequential crankshaft revolutions. The term $\Delta(\Delta T)$ is then examined for absolute value and algebraic sign in a completely digital manner. Of the four possible combinations of absolute value and algebraic sign, only one case, namely that in which the engine roughness exceeds a set-point value while, at the same time, the algebraic sign of the engine roughness is positive in the sense of decreasing engine speed, with the fuel control system be engaged so as to switch to one of the previously referred to basic settings. In all other cases, the system remains at a setting in which a maximum amount of leaning out is obtained. In that particular domain of operation, therefore, the fuel injection or fuel control system is required to distinguish only between two types of adjustment, namely the basic setting resulting in a slight enrichment, and the maximum leaning out.

The apparatus described by the present invention for carrying out the above method includes an AND gate to which the digital signals related to the absolute value and the algebraic sign of the engine roughness are fed and whose output is then connected to the input of a fuel control system, for example to the multiplying circuit of a fuel injection system.

It is emphasized again that, while the subsequent description will be made with respect to a preferred exemplary embodiment in the form of a fuel injection system, the present invention, as well as the system disclosed in U.S. Pat. No. 4,044,235, is useable, in principle, also for any kind of fuel preparation systems, for example carburetors of various types, and the like.

The invention will be better understood as well as further objects and advantages thereof become more apparent from the ensuing detailed description of a preferred exemplary embodiment taken in conjunction with the drawing.

BRIEF DESCRIPTION OF THE DRAWING

The single FIGURE of the drawing is a schematic block diagram of a circuit used in association with an existing fuel control system for measuring engine roughness and adjusting the fuel control system.

DESCRIPTION OF THE PREFERRED EMBODIMENT

The method and apparatus for determining the engine roughness $\Delta(\Delta T)$ in digital fashion are explained in detail in U.S. Pat. No. 4,044,235, the description of which is hereby explicitly incorporated by reference. The method and apparatus described there are substantially improved by the present invention; they will be explained briefly below.

An internal combustion engine is provided with a rotating marker 5, for example on the crankshaft 6. An associated pulse generator 7 generates a signal OT which is used for gating various digital counters. The invention preferably includes three counters, i.e., a first up-counter 1, an intermediate down-counter 2 and a third counter 3 which again operates as an up-counter. In order to measure the roughness of operation of an internal combustion engine, which will be monitored as an rpm fluctuation, the first counter is provided with a relatively high-frequency counting pulse train, whose frequency $f_1$ is chosen to lie, for example, between 1 and 2 MHz. The intermediate counter 2 counts at twice that frequency, i.e., $2f_1$, while the counter 3 again receives the basic counting frequency $f_1$. The three counters are so interconnected that when the signal OT occurs, the contents of a particular counter are transferred in parallel to a subsequent counter. At the start of each counting interval, the counter 1 is reset to 0. The total capacity of the counters 1, 2, 3 is relatively low because the absolute contents of the counters are not important and only the differences between counter contents are used for further processing. For example, it is immaterial whether the counters overflow, even repeatedly, which may occur when appropriately elevated counting frequencies are used and the engine speed is low, i.e., the counting interval is correspondingly large. As is explained in substantial detail in U.S. Pat. No. 4,044,235, the content of the last counter immediately constitutes a numerical value of the engine roughness $\Delta(\Delta T)$ and the algebraic sign of that value is indicated by the so-called MSB (most significant bit) of the last counter 3. The need of providing a frequency divider circuit is avoided by supplying the down-counter 2 with the frequency $f_1$ at the next-to-lowest counting stage. The lowest stage 11 of the down-counter 2 may be, for example, a simple flip-flop.

The magnitude of the engine roughness $\Delta(\Delta T)$ is used as a control variable in a closed-loop control process to operate an engine at the lean-burning limit. In order to perform closed-loop operation, this control value must be compared with a set-point or reference value. A comparison then results in the generation of the required control or adjustment signal which is then applied to the above-referred-to and existing fuel injection system or, more precisely, to its multiplying circuit 15. The content of the counter 3 at the end of a crankshaft revolution is the absolute value of the engine roughness $\Delta(\Delta T)$. The comparison with the reference value is made in a so-called totalizing counter 7 which receives the contents of the counter 3 at the occurrence of the signal OT and maintains it for one subsequent period of revolution. This counter 7 is then counted down at an rpm-dependent frequency $f = f(n)$. If the totalizing counter overflows beyond zero, the reference value is assumed not to have been exceeded. If the zero setting is never reached however, the reference value is assumed to have been exceeded. As is customary in digital technology, the identification of which of these two conditions has occurred is made by examination of the most significant bit (MSB). There are thus available two types of information regarding the prevailing engine roughness, i.e., firstly, an indication if the reference or set-point value was exceeded or not and this information is derived from the most significant bit of the totalizing counter 7. The second item of information is that regarding the algebraic sign of the variable $\Delta(\Delta T)$ and this information is obtained from the most significant bit of the third counter 3. The manner in which the rpm-dependent counting frequency f is obtained for the purpose of counting down the totalizing counter 7 is explained in detail in U.S. Pat. No. 4,044,235 and will thus not be treated further here.

It is a significant aspect of the present invention that the multiplying circuit 15, which is part of a known and existing electronic fuel injection system, is engaged for the purpose of engine roughness control by being supplied with only two different voltage levels rather than a continuum of voltages. The response of the multiplying circuit to these two voltage levels is such that when one of these voltage levels is received, the fuel control system performs a basic setting or adaptation of the duration of the fuel injection control pulses which causes a slight enrichment of the mixture. When the other of the two voltage levels is received, the fuel injection system performs a maximum leaning out which is retained until such time as the results of the constantly ongoing roughness measurements cause the system to switch back to the basic setting. A system which operates according to the method and construction of the present invention functions entirely digitally and is thus able to supply to the multiplying circuit 15 information regarding engine roughness during each and every crankshaft revolution. For this reason, a digital roughness control operating on the principle of two-point control is extraordinarily rapid in response.

Inasmuch as the calculation of the engine roughness $\Delta(\Delta T)$ takes place once for each crankshaft revolution under the control of the gating signal OT, the next following revolution of the crankshaft may involve a change to the basic setting or to maximum leaning out. The choice between these two voltage levels is made according to the criteria of magnitude and algebraic sign of the engine roughness variable $\Delta(\Delta T)$.

The decision as to which of the two possible voltage levels is used may be listed in the following table:

| $\lvert\Delta(\Delta T)\rvert$ reference exceeded | sign of $\Delta(\Delta T)$ | basic setting |
|---|---|---|
| 1 | 1 | 1 |
| 1 | 0 | 0 |
| 0 | 1 | 0 |
| 0 | 0 | 0 |

The entry 1 corresponds to affirmation that the reference value was exceeded while the entry 0 corresponds to the statement that the reference value was not exceeded. In the second column, the entry 1 means that the sign of $\Delta(\Delta T)$ is positive in the sense of decreasing rpm.

The entries of the third column of the table which identifies the basic control setting indicate that only one of the four possible cases, i.e., when $\Delta(\Delta T)$ is positive in the sense of decreasing rpm while, at the same time, the magnitude of $\Delta(\Delta T)$ has exceeded its reference or set-point value, does the system switch over to a basic setting. In all other cases (entry 0), the system retains a setting of maximum leaning out, i.e., a maximum shortening of the final fuel injection control pulses.

Actual tests using a vehicle on a stationary roller test stand and employing the two-point roughness control according to the present invention have given the following results in a CVS test (= constant volume sampling, i.e., the U.S. Federal Test for the control of the EPH emission standards). Comparison data using a control process employing an analog integrating circuit as described in U.S. Pat. No. 4,044,235 are given for comparison.

| | basic setting | w/integrator | purely digital |
|---|---|---|---|
| Fuel consumption | 13,2 liters 100 km | 12,75 liters/ 100 km | 12,6 liters/ 100 km |
| CO | 39,5 g/mile | 16 g/mile | 17 g/mile |
| HC | 6,5 g/mile | 4,5 g/mile | 4,5 g/mile |
| Nox | 3,9 g/mile | 3,2 g/mile | 4,4 g/mile |

Except for NOx emissions, the values of exhaust emissions are seen to be substantially equal. In purely digital two-point roughness control, the fuel consumption is slightly lower than when an analog integrating stage is used. The reference values were chosen at some arbitrary place in the lean operating region of the engine. It was found that when the analog integrating circuit was employed, that the drivability and overall behavior of the vehicle were not very satisfactory whereas when purely digital two-point control was employed, the drivability was substantially improved and the comfort of operating the vehicle was also better.

A system which generates two voltage levels may in practice be realized in a circuit which takes the prevailing states (a logical 1 or a logical 0) from the MSB of the totalizing counter 7 and the third up-counter 3 and applies them to an AND gate 16 whose output is then connected to the voltage-responsive input 17 of the multiplying circuit 15. It will be appreciated that the digital association of the various criteria displayed in the first table corresponds to the logical diagram or truth table of an AND gate.

As has already been stressed, the invention is suitable for use with any type of mixture preparation system, for example those constituted by carburetors, fuel injection systems and the like. If carburetors are used, the system could cause the nozzle cross section for fuel flow to be altered, thereby changing the amount of fuel supplied to the induction tube. It is possible, however, to change other operating regions of the carburetor, including those which change the composition of the fuel-air mixture under the control of an exhaust gas composition sensor.

The invention may also be used particularly well for controlling the exhaust gas recycle rate in mixture preparation systems, for controlling the flowthrough bypass lines or for the supplementary adjustment of fuel injection control pulses in electronic fuel injection systems, particularly by engaging the multiplying circuit of such systems.

The foregoing relates to a preferred exemplary embodiment of the invention, it being understood that other embodiments and variants thereof are possible within the spirit and scope of the invention.

What is claimed and desired to be secured by Letters Patent of the United States is:

1. A method for controlling an internal combustion engine to operate with a leaned-out fuel-air mixture, said method including:

measuring engine speed;

measuring air flow rate into the engine;

deriving from these measurements a fuel control signal;

correcting said fuel control signal according to engine variables, one of these variables being engine roughness defined as the difference between successive differences of sequential periods of engine revolution; said differences of sequential periods being obtained by counting a first counter upward at a fixed frequency during one engine revolution (period), counting a third counter upward at the same fixed frequency and counting a second counter downward at twice said fixed frequency, transferring the contents of the first counter to the second counter and the contents of the second counter to the third counter at the end of each counting period while setting the first counter to zero, transferring the contents of the third counter to a totalizing register, and counting the totalizing register down at an rpm-dependent frequency, after which the contents of the totalizing register are used to correct said fuel control signal and wherein the improvement comprises the steps of:

determining from said contents of said totalizing register if said register had overflowed during the down-counting thereof;

determining the algebraic sign of said engine roughness; and choosing one of the four possible combination of states of said overflow and said algebraic sign and providing therefor a first adjustment datum for adjusting said fuel control signal and providing a second adjustment datum for the remaining three of the four possible combinations of states of overflow and algebraic sign.

2. A method as defined by claim 1 for use with a fuel injection control system in an internal combustion engine, said control system including a control pulse extension circuit (multiplier circuit), said method comprising the further step of:

generating first and second voltages to correspond to said first and second adjustment datum, respectively, and applying said first and second voltages alternately to said control pulse extension circuit; whereby a 2-point control process is performed.

3. A method as defined by claim 1, wherein said algebraic sign of the engine roughness is determined from the most significant bit of said third counter and said condition of overflow of said totalizing register is determined from the most significant bit of said totalizing register.

4. A fuel mixture controller for an internal combustion engine, said controller including means for measuring air flow and engine speed and forming therefrom fuel control signals and including adjustment means for adjusting said fuel control signals on the basis of engine variables, one of said variables being the engine roughness, defined as the difference between successive differences of sequential periods of engine revolutions, said controller further including first, second and third digital counters and said differences of sequential periods being obtained by counting a first counter upward at a fixed frequency during one engine revolution (period), counting a third counter upward at the said fixed frequency and counting a second counter downward at twice said fixed frequency, transferring the contents of the first counter to the second counter and the contents of the second counter to the third counter at the end of each counting period while setting the first counter to zero, transferring the contents of the third counter to a totalizing register, and counting the totalizing register down at an rpm-dependent frequency, and wherein the improvement comprises:

an AND gate one of whose inputs is connected to said third counter to receive the most significant bit thereof at the conclusion of each counting period and the other of whose inputs is connected to said totalizing register to receive the most significant bit thereof at the conclusion of each counting period; and the output of said AND gate is applied to said adjustment means; whereby said fuel control signals are adjusted in the manner of a 2-point control process.

5. A fuel mixture controller as defined by claim 4, wherein said engine is provided with a fuel injection system, including electromagnetic fuel injection valves, said fuel control signals are electric pulses whose width determines the duration of opening of said fuel injection valves, and said adjustment means includes a voltage controlled pulse width extension circuit (multiplier circuit) to which said output from said AND gate is applied.

* * * * *